(12) United States Patent
Toyoshima et al.

(10) Patent No.: US 9,757,935 B2
(45) Date of Patent: Sep. 12, 2017

(54) ADHESIVE-FILM EXFOLIATING DEVICE AND MANUFACTURING METHOD OF LIQUID CRYSTAL DISPLAY PANEL USING THE DEVICE

(75) Inventors: Takeshi Toyoshima, Yokohama (JP);
Tanemasa Harada, Mitaka (JP);
Shigeru Iwase, Chigasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1055 days.

(21) Appl. No.: 12/048,986

(22) Filed: Mar. 14, 2008

(65) Prior Publication Data
US 2008/0245483 A1 Oct. 9, 2008

(30) Foreign Application Priority Data
Mar. 16, 2007 (JP) .................................. 2007-067981

(51) Int. Cl.
*G02F 1/13* (2006.01)
*B32B 43/00* (2006.01)

(52) U.S. Cl.
CPC .......... *B32B 43/006* (2013.01); *G02F 1/1303* (2013.01); *B32B 2457/202* (2013.01);
(Continued)

(58) Field of Classification Search
CPC ......... Y10T 156/1168; Y10T 156/1978; Y10T 156/1989; Y10S 156/924
(Continued)

(56) References Cited

U.S. PATENT DOCUMENTS 3,996,127 A * 12/1976 Rautimo et al. ............... 204/281
4,685,991 A * 8/1987 Herrmann et al. ........... 156/344
(Continued)

FOREIGN PATENT DOCUMENTS

JP 8-99769 4/1996
JP 9-114384 5/1997
(Continued)

OTHER PUBLICATIONS

Office Action issued Jan. 31, 2012 in Japan Application No. 2007-067981 (With English Translation).
(Continued)

*Primary Examiner* — Mark A Osele
(74) *Attorney, Agent, or Firm* — Oblon, McClelland, Maier & Neustadt, L.L.P.

(57) ABSTRACT

An adhesive-film exfoliating device includes an absorption stage 6 for absorbing a liquid crystal display panel 4 in which a polarizing plate 3 is adhered to a glass plate 2, a clamping unit 7 for clamping a corner 3a of the polarizing plate 3 exfoliated from the glass plate 2 and a ball screw shaft 11 for moving the absorption stage 6 relatively to the clamping unit 7. A ball screw nut 14 in screw-engagement with the ball screw shaft 11 is fixed on a back surface of the absorption stage 6. With the rotation of the ball screw shaft 11, the absorption stage 6 integral with the ball screw nut 14 is slid in a direction to exfoliate the polarizing plate 3 exfoliated from the glass plate 2. In a manufacturing method of the liquid crystal display panel 4, a process of exfoliating the polarizing plate 3 from the glass plate 2 includes steps of moving the absorption stage 6 while allowing the clamping unit 7 to clamp the corner 3a of the polarizing plate 3.

10 Claims, 6 Drawing Sheets

(52) U.S. Cl.
CPC .... *Y10T 156/1168* (2015.01); *Y10T 156/1189* (2015.01); *Y10T 156/1972* (2015.01); *Y10T 156/1978* (2015.01); *Y10T 156/1989* (2015.01)

(58) Field of Classification Search
USPC ............... 156/344, 584, 714, 764, 766, 924
See application file for complete search history.

(56) References Cited

U.S. PATENT DOCUMENTS

| | | | |
|---|---|---|---|
| 4,956,044 A * | 9/1990 | Watanabe et al. | 156/350 |
| 5,676,789 A * | 10/1997 | Hamamura | 156/714 |
| 6,149,758 A * | 11/2000 | Tsujimoto et al. | 156/701 |
| 6,227,276 B1 * | 5/2001 | Kim et al. | 156/584 |
| 6,503,130 B2 * | 1/2003 | Lim | 451/285 |
| 7,644,747 B2 * | 1/2010 | Ohkawara et al. | 156/584 |
| 7,713,368 B2 * | 5/2010 | Yoshioka et al. | 156/247 |
| 2008/0185100 A1 * | 8/2008 | Jang et al. | 156/344 |
| 2008/0236743 A1 * | 10/2008 | Kye et al. | 156/344 |

FOREIGN PATENT DOCUMENTS

| | | |
|---|---|---|
| JP | 9-309664 | 12/1997 |
| JP | 2002-128388 | 5/2002 |
| JP | 2003-17644 A | 1/2003 |
| JP | 2004-163738 | 6/2004 |
| JP | 2004-322645 A | 11/2004 |
| JP | 2005-17444 | 1/2005 |
| JP | 2006-299064 | 11/2006 |
| JP | 2007-25651 | 2/2007 |

OTHER PUBLICATIONS

Office Action dated Nov. 6, 2012 in Japanese Patent Application No. 2007-067981 (with English-language translation).

* cited by examiner

ADHESIVE-FILM EXFOLIATING DEVICE AND MANUFACTURING METHOD OF LIQUID CRYSTAL DISPLAY PANEL USING THE DEVICE

BACKGROUND OF THE INVENTION

1. Field of the Invention

The present invention relates to an adhesive-film exfoliating device for exfoliating an adhesive film and a manufacturing method of a liquid crystal display panel using the adhesive-film exfoliating device. More particularly, the invention relates to an adhesive-film exfoliating device used in exfoliating an adhesive film, such as polarizing plate, from a glass plate of a liquid crystal display panel and a manufacturing method of the liquid crystal display panel, the method including a process of exfoliating the adhesive film from the glass plate by using the adhesive-film exfoliating device.

2. Description of the Related Art

Generally, the liquid crystal display panel comprises a pair of laminated glass plates interposing liquid crystal therebetween and polarizing plates adhered to external surfaces of the glass plates.

If a polarizing plate has a defective, such as scratches or impurity, found at an appearance inspection or lighting test for the liquid crystal display panel, it is necessary to exfoliate the defective polarizing plate from the glass plate and replace the former plate with a new non-defective polarizing plate.

Japanese Patent Publication Laid-open No. 2006-299064 discloses an adhesive-film exfoliating device which is used to exfoliate a polarizing plate from the glass plate.

The above adhesive-film exfoliating device is illustrates in FIGS. 1 and 2 partially. As shown in FIG. 1, the adhesive-film exfoliating device includes a plurality of carrier rollers 100, a pair of guide rollers 101 and a take-up roller 102. These rollers 100, 101 and 102 are arranged so that respective rotational center lines are paralleled with each other. The guide rollers 101 in pairs are adjacent to each other. The take-up roller 102 is operationally connected to a drive motor (not shown) as drive means, while no drive means is associated with the carrier rollers 100 or the guide rollers 101.

When required to exfoliate a polarizing plate 105 sticking to the glass plate 104, the polarizing plate 105 is partially exfoliated from the glass plate 104 at one corner of a liquid crystal display panel 103 and successively, it is mounted on the carrier roller 102 on making the so-exfoliated polarizing plate 105 direct downwardly.

Next, preparing an adhesive tape (not shown), its one end is applied to the exfoliated corner of the polarizing plate 105. While, the other end of the adhesive tape is led toward the take-up roller 102 through a gap between the guide rollers 101 and finally applied on the take-up roller 12.

Subsequently, the drive motor is driven to rotate the take-up roller 102 in the direction of arrow "A". With the rotation of the take-up roller 102 in the direction of arrow "A", the polarizing plate 105 is exfoliated from the glass plate 104 in the pulling direction of arrow "B". The polarizing plate 105 off the glass plate 104 is taken up by the take-up roll 102. While the polarizing plate 105 is pulled in the direction of arrow "B" and exfoliated from the glass plate 104, the liquid crystal display panel 103 moves on the carrier roller 100 in the direction of arrow "C".

SUMMARY OF THE INVENTION

However, the above-mentioned adhesive-film exfoliating device is not thoughtful of the following points.

First, when the polarizing plate 105 is pulled in the direction of arrow "B" and exfoliated from the glass plate 104, the liquid crystal display panel 103 makes contact with the guide rollers 101 at two contact points "D", "D". An interval E between the contact points "D", "D" is substantially equal to the diameter of each guide roller 101. The diameter of the guide roller 101 has to be reduced in order to make the interval "E" smaller. However, there is a limit to reduce the diameter of the guide roller 101 while maintaining the strength of the guide roller 101.

When the polarizing plate 105 is pulled in the direction of arrow "B" on condition that the liquid crystal display panel 103 is making contact with the guide rollers 101 at two contact points "D", "D", a convex deflection in the direction of arrow "B" (i.e. a recess area on the front side) is produced in a part of the liquid crystal display panel 103 between the contacts "D", "D", so that a bending stress in the direction of arrow "B" with the contact points "D", "D" as fulcrums is applied on the liquid crystal display panel 103. The bending stress has a tendency of increasing as the interval "E" between the contact points "D", "D" gets increased. If the bending stress on the liquid crystal display panel 103 exceeds a certain value, then the glass plate 101 collapses.

Recently, with progress in thin formation of the liquid crystal display panel 103, the glass plate 104 in the panel 103 is also reduced in its thickness. In the so-thinned liquid crystal display panel 103, the thickness of the glass plate 104 is reduced to approx. 0.2 mm recently. Under this situation, the glass plate 104 is easy to be broken in pulling the polarizing plate 105 to exfoliate it from the glass plate 104.

Under such a situation, an object of the present invention is to provide an adhesive-film exfoliating device capable of suppressing bending stress acting on an adhered object when pulling an adhesive film in order to exfoliate it from the adhered object to thereby prevent it from being broken by an excessive bending stress. Another object of the present invention is to provide a manufacturing method of a liquid crystal display panel, having a process of exfoliating the adhesive film from the adhered object while suppressing a bending stress exerted on it.

In order to attain the former object, according to the present invention, there is provided an adhesive-film exfoliating device comprising: an absorption stage for mounting an adhered object having an adhesive film adhered thereto, the adhered object being absorbed onto the absorption stage; a clamper configured to clamp a corner of the adhesive film, the corner being exfoliated from the adhered object; and a feeder that feeds at least one of the absorption stage and the clamper in a direction to exfoliate the adhesive film from the adhered object.

In order to attain the latter object, according to the present invention, there is also provided a manufacturing method of a liquid crystal display panel, comprising, in a process of exfoliating an adhesive film, which is a polarizing plate, adhered to a main surface of the liquid crystal display panel, the steps of: making the main surface of the liquid crystal display panel absorbed onto an absorption stage; allowing a clamper to clamp a corner of the adhesive film exfoliated from the main surface of the liquid crystal display panel absorbed onto the absorption stage; and moving at least one of the absorption stage and the clamper thereby exfoliating the adhesive film from the main surface of the liquid crystal display panel.

With the above adhesive-film exfoliating device and the above manufacturing method of a liquid crystal display panel, when the adhesive film is pulled to exfoliate it from the adhered object, a bending stress applied on the adhered object can be moderated to prevent it from being broken by an excessive bending stress.

DETAILED DESCRIPTION OF THE PREFERRED EMBODIMENTS

Figure 1:
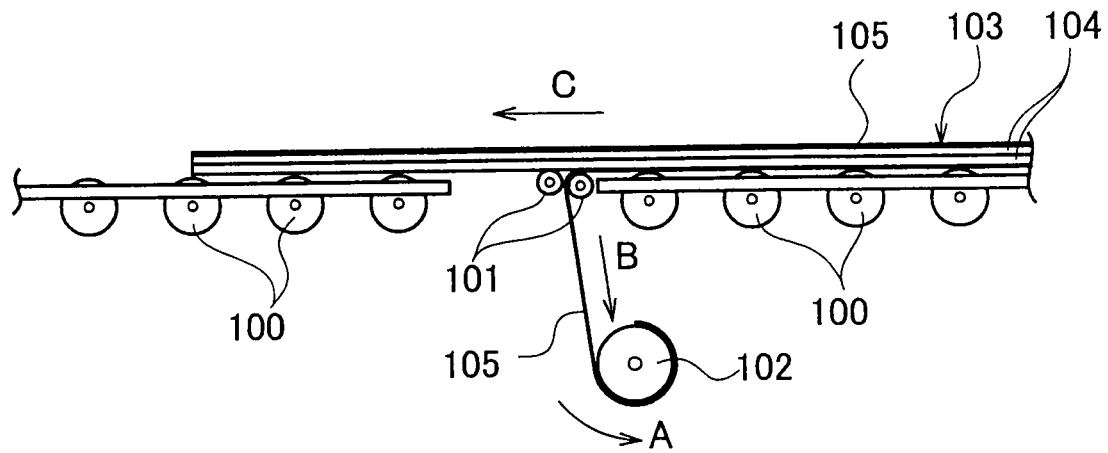
FIG. 1 is a side view of an adhesive-film exfoliating device in prior art.
Figure 2:
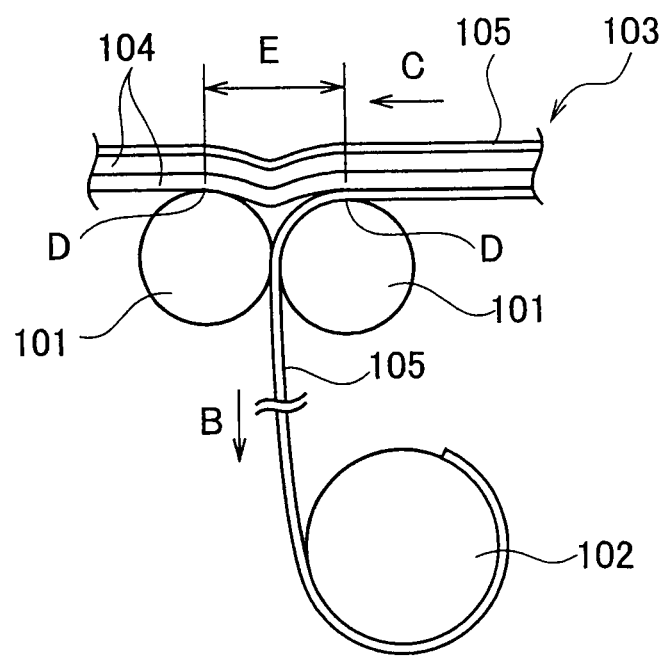
FIG. 2 is a side view of a part of the device of FIG. 1 in enlargement.

An embodiment of the present invention will be described with reference to attached drawings.

An adhesive-film exfoliating device 1 of this embodiment is adapted so as to exfoliate a polarizing plate 3 (as an adhesive film) from a glass plate 2 (as an adhered object) in a liquid crystal display panel 4. Here, the liquid crystal display panel 4 comprises two sheets of glass plates 2 in lamination, liquid crystal enclosed between the glass plates 2 in lamination and a pair of polarizing plates 3 adhered to both outside surfaces of the glass plates 2.

Figure 3:
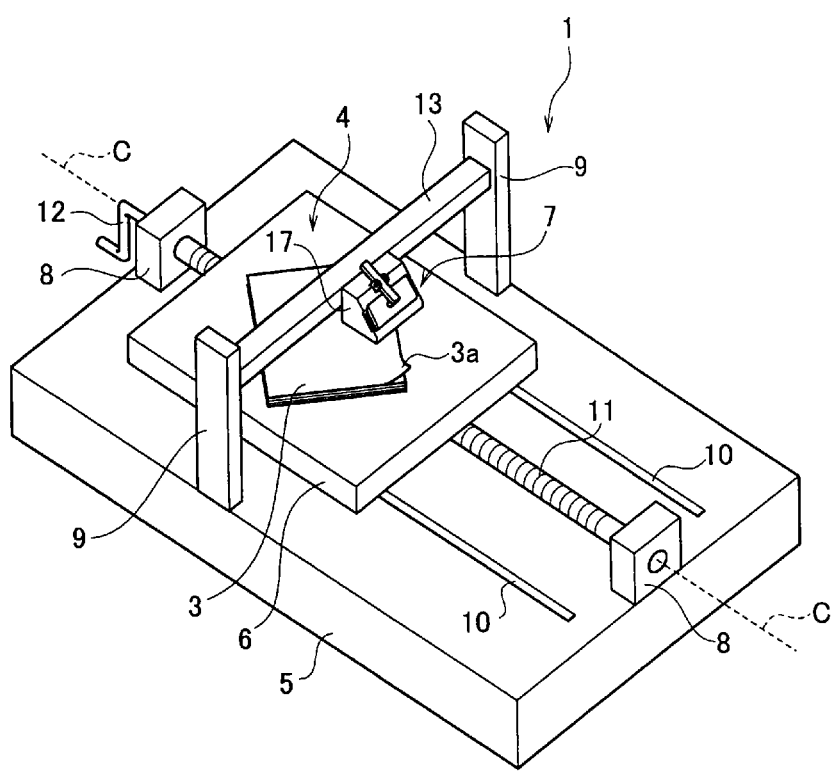
FIG. 3 is a perspective view showing an exfoliating device in accordance with an embodiment of the present invention.

As shown in FIG. 3, the exfoliating device 1 includes a base 5, an absorption stage 6 and a clamping unit 7 (as clamping means).

The base 5 is formed by a rectangular parallelepiped member and installed in a work area for exfoliating the polarizing plate 3 from the liquid crystal display panel 4.

A pair of supports 8 and a pair of struts 9 are arranged so as to stand on a top surface of the base 5. The base 5 is provided, on the top surface, with a pair of slide grooves 10.

By the supports 8 in pairs, a ball screw shaft 11 (as feeding means) is supported so as to be rotatable about a center line "C". A handle 12 is connected to one end of the ball screw shaft 11. By operating the handle 12 to rotate the ball screw shaft 11 about the center line "C", it is possible to move the absorption stage 6 in the direction of the center line "C" of the ball screw shaft 11.

The struts 9 are arranged so as to be perpendicular to the ball screw shaft 11. An attachment beam 13 is fixed to the struts 9 in pairs so as to extend therebetween.

The absorption stage 6 is arranged so as to have a stage's under surface opposed to the top surface of the base 5. A single screw nut 14 and a plurality of leg parts 15 are fixed on the under surface of the base 5. The screw nut 14 has a female screw formed on its inner circumference. The screw nut 14 is screw-engaged with the ball screw shaft 11. The leg parts 15 are slidably engaged in the slide grooves 10.

On the absorption stage 6, a plurality of absorption channels (not shown) are formed so as to gridiron the top surface of the stage 6, at regular intervals of 5 mm. The absorption channels are connected to a suction pump 16 through a communication path (not shown) formed in the absorption stage 6. The absorption channels are formed so as to spread within a range somewhat smaller than the size of the liquid crystal display panel 4 as an object to be exfoliated.

By driving the suction pump 16 on condition that the liquid crystal display panel 4 is mounted on the top surface of the absorption stage 6, the liquid crystal display panel 4 can be absorbed onto the absorption stage 6.

The clamping unit 7 includes a base 17 fixed to the attachment beam 13 and a pinch lever 19 that is mounted on the base 17 so as to be rotatable about a pivot shaft 18 as a fulcrum. The base 17 is formed with a teeth part 20. While, the pinch lever 19 is formed with a teeth part 21 in a position opposing the above teeth part 20 of the base 17. In the base 17, its surface with the teeth part 20 is formed at an acute angle α (e.g. 45 degrees) with the top surface of the absorption stage 6.

Figure 4:
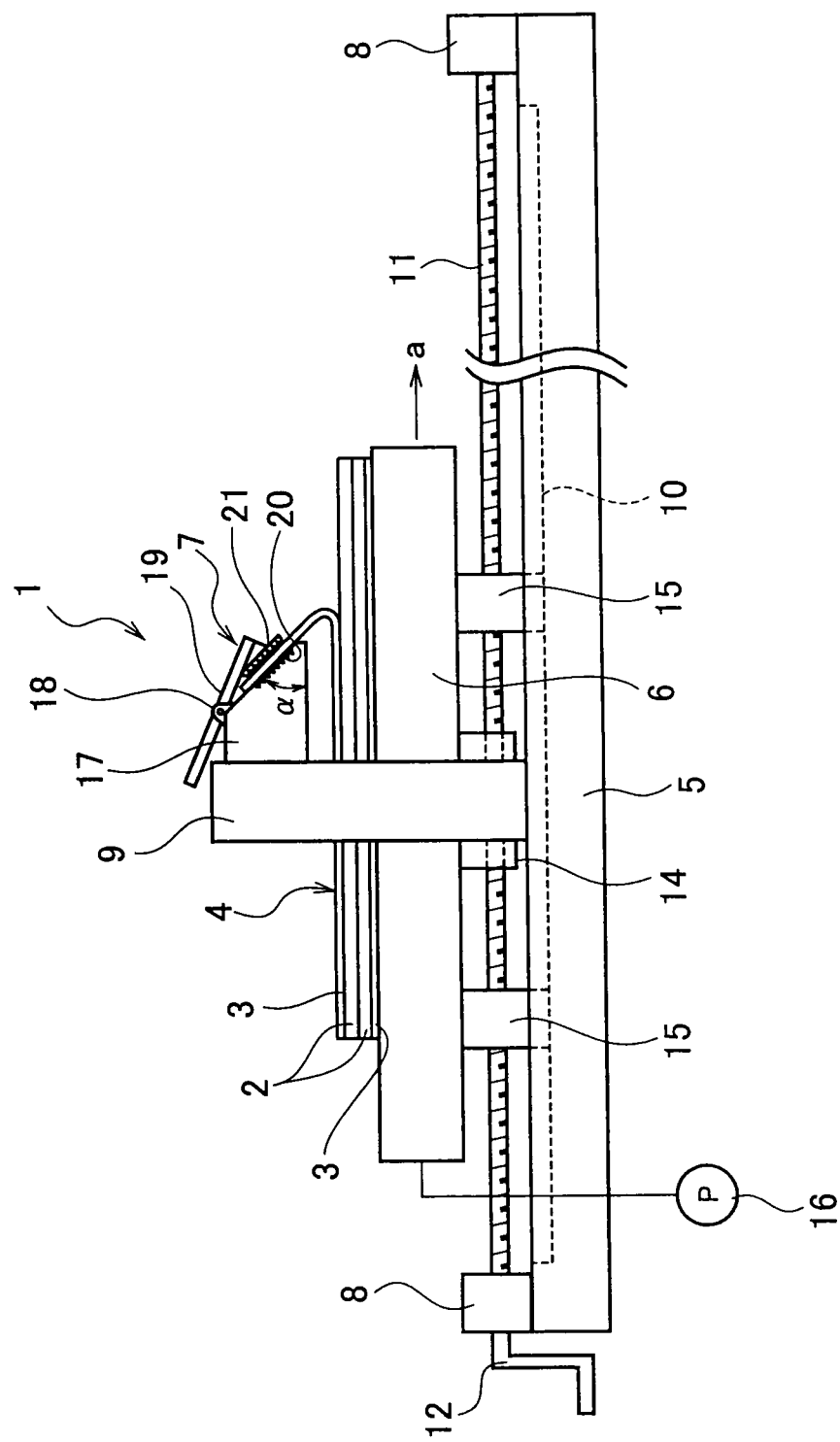
FIG. 4 is a side view of the exfoliating device of FIG. 3.

The vertical distance between the top surface of the base 5 and the clamping unit 17 is thus fixed by the length of the struts. The base 5 has slide grooves 10 in which the leg parts 15 of the absorption stage 6 slidably engage. FIG. 4 shows that the slide grooves 10 have a constant depth along their lengths, whereby the leg parts 15 of the absorption stage 6 will slide in the direction "a" that is parallel to the top surface of the base 5 throughout its length of movement.

Since the vertical distance between the top surface of the base 5 and the clamping unit 17 is fixed, and the absorption stage 6 will slide in a direction parallel to the top surface of the base 5 throughout its length of movement, the vertical distance between the fixed clamping unit 17 and the absorption stage 6 that supports the display panel 4 is constant, e.g., the distance H1 shown in FIG. 7, throughout the length of movement of the absorption stage.

The work procedure to exfoliate the polarizing plate 3 from the glass plates 2 of the liquid crystal display panel 4 will be described below.

Figure 5:
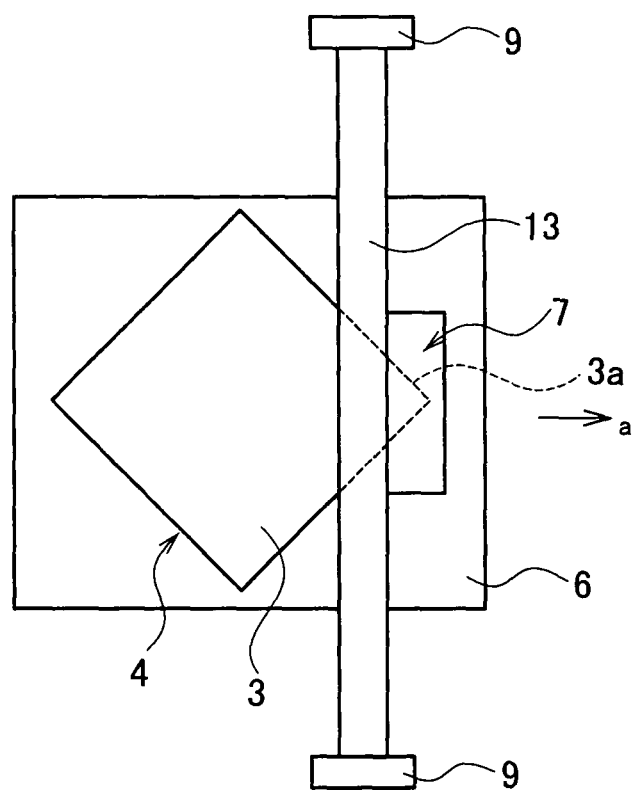
FIG. 5 is a plan view of the exfoliating device of FIG. 3.

First of all, the liquid crystal display panel 4 as an object to be processed is prepared and successively, the polarizing plate 3 is exfoliated, at one corner 3a, from the panel 4 partially. Then, the polarizing plate 3 is mounted on the absorption stage 6 so that the exfoliated corner 3a turns upward. In detail, as shown in FIG. 5, the liquid crystal display panel 4 is arranged so as to cover the absorption channels in the absorption stage 6 while the exfoliated end 3a is taking over the lead of the polarizing plate 3 in the moving direction (i.e. direction of arrow "a") of the absorption stage 6 in the exfoliating operation.

With the above-mentioned positioning of the liquid crystal display panel 4, the suction pump 16 is driven to absorb the panel 4 onto the absorption stage 6.

The exfoliated corner 3a of the polarizing plate 3 is pinched between the teeth part 20 of the base 17 and the teeth part 21 of the pinch lever 19. Then, by a not-shown worker, the handle 12 is manipulated in rotation to slide the absorption stage 6 in the direction of arrow "a". Consequently, the absorption stage 6 slides along the center line "C" of the ball screw shaft 11.

Figure 6A:
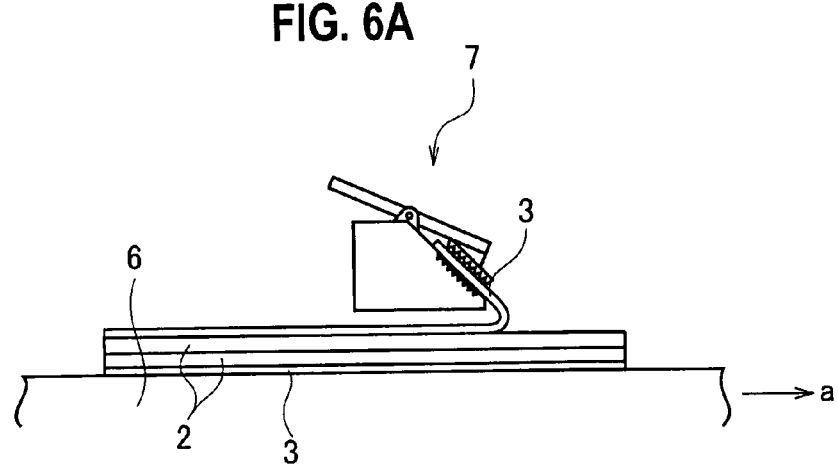
FIGS. 6A, 6B and 6C are process views showing an exfoliating process of a polarizing plate.
Figure 6B:
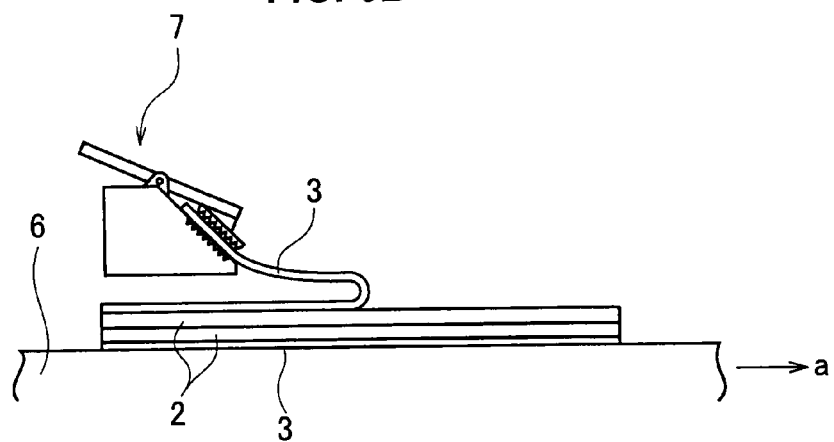
Figure 6C:
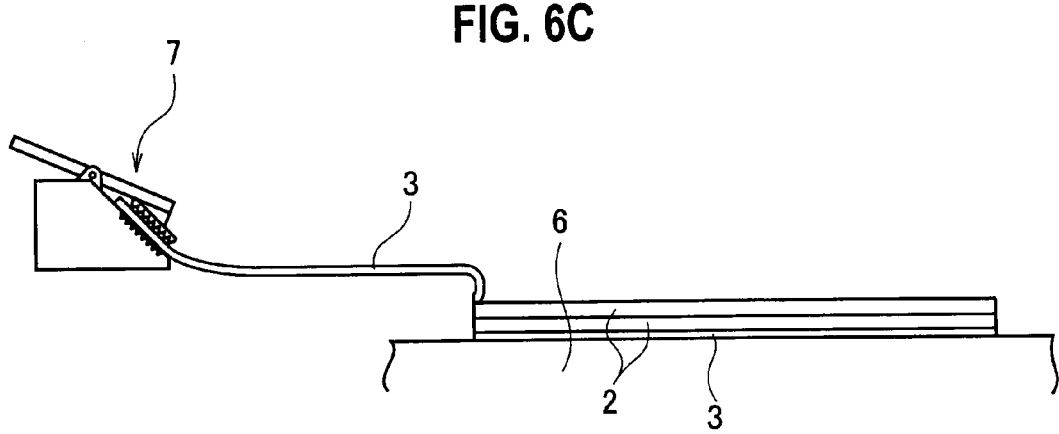

With the sliding of the absorption stage 6 in the direction of arrow "a" on condition that the corner 3a is pinched by the clamping unit 7, the polarizing plate 3 is exfoliated from the glass plates 2 by little and little, as shown in FIGS. 6A to 6C. At the time when the absorption stage 6 in slide movement has reached a position shown in FIG. 6C, the operation of exfoliating the polarizing plate 3 from the glass plates 2 is completed.

During the exfoliation of the polarizing plate 3 from the glass plate 2, as the liquid crystal display panel 4 is absorbed onto the absorption stage 6, there is little deflection of the glass plates 2 in spite of pulling the polarizing plate 3 upward, allowing a restriction of the bending stress on the glass plates 2. Thus, it is possible to prevent the glass plates 2 from being broken due to an excessive bending stress.

Figure 7A:
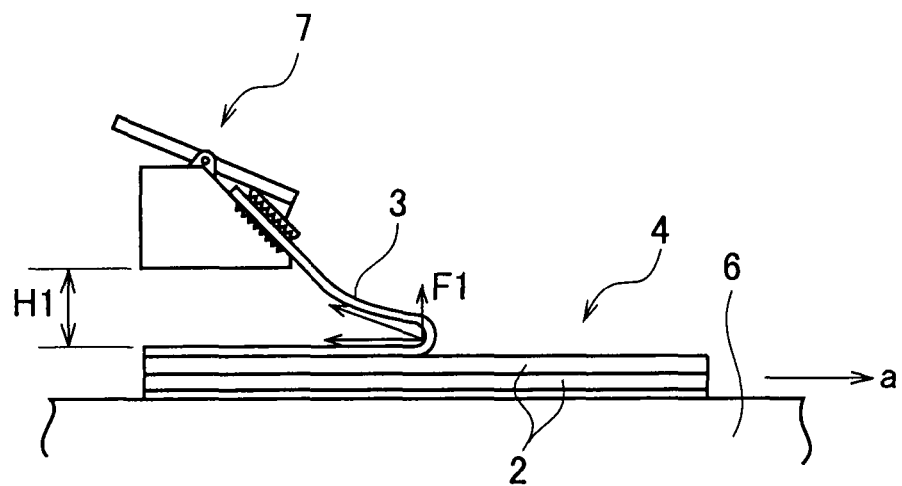
FIGS. 7A and 7B are views explaining the change of force acting in the direction to exfoliate a liquid crystal display panel from an absorption stage, derived from the difference in an interval between a clamper and the liquid crystal display panel.
Figure 7B:
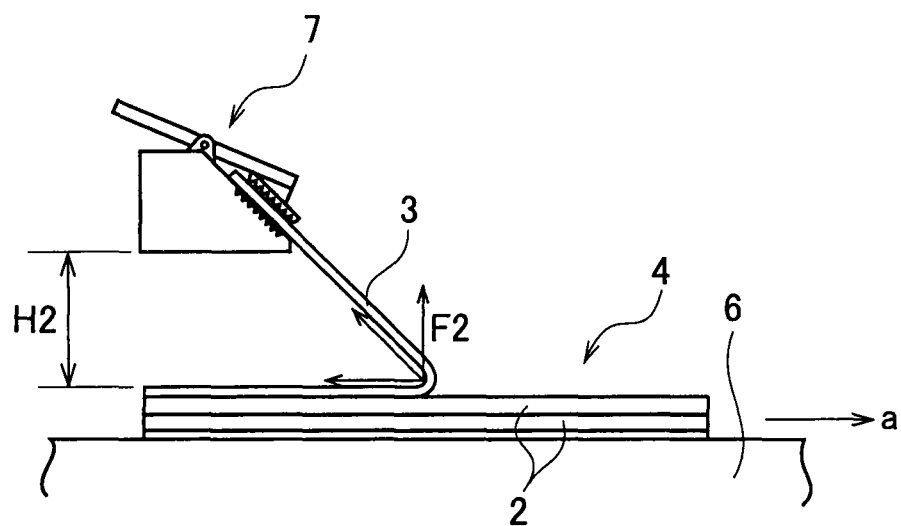

Preferably, the clamping unit 7 is arranged so as to be close to the liquid crystal display panel 4 as possible. FIG. 7A illustrates an arrangement where the clamping unit 7 is arranged so as to come close to the liquid crystal display panel 4 at a distance "H1". While, FIG. 7B illustrates another arrangement where the clamping unit 7 is arranged apart from the liquid crystal display panel 4 at a distance "H2". We now compare a component force F1 (FIG. 7A) of a force applied on the glass plates 2 in the process of exfoliating the polarizing plate 3 with another component force F2 of FIG. 7B. Note, during exfoliating of the polarizing plate 3, these component forces F1, F2 act on the liquid crystal display panel 4 in the direction to exfoliate it from the absorption stage 6. From these figures, it is obvious that the component force F1 of FIG. 7A is smaller than the component force F2 of FIG. 7B. This means that the closer arrangement of FIG. 7A enables the bending stress on the glass plate 2 to be reduced in comparison with the arrangement of FIG. 7B. For this reason, it is desirable to arrange the clamping unit 7 close to the liquid crystal display panel 4 as possible.

In a modification, the clamping unit 7 may be slidable to the absorption stage 6 in the stable state in an opposite direction to the direction of arrow "a", although the absorption stage 6 is slidable in the direction of arrow "a" in the illustrated embodiment. Alternatively, the clamping unit 7 may be slidable in the opposite direction to the direction of arrow "a" on condition that the absorption stage 6 is slidable in the direction of arrow "a".

Additionally, the absorption stage 6 may be provided with a plurality of absorption holes in place of the absorption channels of the embodiment.

Although the formation of the absorption channels is directed to the liquid crystal display panel 4 of a single size in the illustrated embodiment, the absorption channels may be formed so as to cope with several kinds of liquid crystal display panels of different sizes. In detail, for instance, a not-shown solenoid valve openable and closable corresponding to the selected liquid crystal display panel 4 is arranged between the absorption channels and the suction pump 16. With the provision of the solenoid valve, its closing operation is controlled so that negative pressure (vacuum) of the pump 16 is not applied to absorption channels (part) positioned outside the liquid crystal display panel 4 to be absorbed but only absorption channels inside the panel 4.

In this way, according to the present invention, it is possible to suppress a bending stress on the adhered object in pulling the adhesive film in the process of exfoliating it from the adhered object, whereby the breakage of the adhered object by an excessive bending stress can be prevented.

Although the present invention has been described above by reference to one embodiment of the invention, this invention is not limited to this and further modifications will occur to those skilled in the art, in light of the teachings. The scope of the invention is defined with reference to the following claims.

This application is based upon the Japanese Patent Applications No. 2007-067981, filed on Mar. 16, 2007, the entire content of which is incorporated by reference herein.

What is claimed is:

1. An adhesive-film exfoliating device comprising:
    an absorption stage for mounting an adhered object having an adhesive film adhered thereto, the adhered object being absorbed onto the absorption stage;
    a clamper configured to clamp a corner of the adhesive film, the corner being exfoliated from the adhered object; and
    a feeder configured to feed at least one of the absorption stage and the clamper in a direction parallel to the surface of the adhered object having the adhesive film adhered thereto, to exfoliate the adhesive film from the adhered object, while maintaining a constant distance, perpendicular to the surface of the adhered object having the adhesive film adhered thereto, between the clamper and the adhered object throughout exfoliation of the adhesive film from the adhered object, wherein
    the clamper comprises a clamping unit having a base and a pinch lever rotatably mounted on the base, the base having an inclined surface making an acute angle with a top surface of the absorption stage, wherein
    the clamping unit is configured to pinch the corner of the adhesive film in a manner such that a non-adhesive surface of the corner of the adhesive film faces to the inclined surface of the base, wherein
    the film is folded back at a tip side of the inclined surface of the base in a manner such that the non-adhesive surface makes the acute angle with the top surface of the absorption stage, and wherein
    the film is clipped by the pinch lever on the inclined surface of the base.

2. The adhesive-film exfoliating device of claim 1, wherein
    the absorption stage is formed, on a top surface thereof, with a plurality of absorption channels or holes communicated with a source of negative pressure.

3. The adhesive-film exfoliating device of claim 2, wherein
    the source of negative pressure comprises a suction pump.

4. The adhesive-film exfoliating device of claim 1, wherein
    the base and the pinch lever have teeth parts for pinching the corner of the adhesive film.

5. The adhesive-film exfoliating device of claim 4, wherein
    the teeth part of the base is formed on the inclined surface.

6. The adhesive-film exfoliating device of claim 4, wherein
    the clamping unit is arranged close to the absorption stage.

7. The adhesive-film exfoliating device of claim 1, wherein
    the feeder comprises a ball screw shaft and a ball screw nut screw-engaged with the ball screw shaft; and
    the ball screw nut is fixed to the absorption stage.

8. The adhesive-film exfoliating device of claim 1, wherein
    the adhesive film is a polarizing plate, while the adhered object is a glass plate forming a liquid crystal display panel.

9. The adhesive-film exfoliating device of claim 1, wherein the inclined surface is positioned between said absorption stage and said pinch lever.

10. A manufacturing method of a liquid crystal display panel, comprising, in a process of exfoliating an adhesive film, which is a polarizing plate, adhered to a main surface of the liquid crystal display panel:

making the main surface of the liquid crystal display panel absorbed onto an absorption stage;

allowing a clamper to clamp a corner of the adhesive film exfoliated from the main surface of the liquid crystal display panel absorbed onto the absorption stage; and moving at least one of the absorption stage and the clamper parallel to the main surface of the liquid crystal display panel, thereby exfoliating the adhesive film from the main surface of the liquid crystal display panel, while maintaining a constant distance, perpendicular to the surface of the adhered object having the adhesive film adhered thereto, between the clamper and the adhered object throughout the step of exfoliating the adhesive film from the main surface of the liquid crystal display panel, wherein the clamper comprises a clamping unit having a base and a pinch lever rotatably mounted on the base, the base having an inclined surface making an acute angle with a top surface of the absorption stage, wherein the clamping unit is configured to pinch the corner of the adhesive film in a manner such that a non-adhesive surface of the corner of the adhesive film faces to the inclined surface of the base, wherein the film is folded back at a tip side of the inclined surface of the base in a manner such that the non-adhesive surface makes the acute angle with the top surface of the absorption stage, and wherein the film is clipped by the pinch lever on the inclined surface of the base.

\* \* \* \* \*